(12) United States Patent  (10) Patent No.: US 7,806,217 B2
Hasegawa et al.  (45) Date of Patent: Oct. 5, 2010

(54) MOTORCYCLE

(75) Inventors: Yosuke Hasegawa, Wako (JP); Atsushi Mamiya, Atsugi (JP); Ryota Okamura, Atsugi (JP)

(73) Assignee: Honda Motor Co., Ltd., Tokyo (JP)

( * ) Notice: Subject to any disclaimer, the term of this patent is extended or adjusted under 35 U.S.C. 154(b) by 249 days.

(21) Appl. No.: 12/058,081

(22) Filed: Mar. 28, 2008

(65) Prior Publication Data

US 2008/0236923 A1  Oct. 2, 2008

(30) Foreign Application Priority Data

Mar. 30, 2007 (JP) ............................. 2007-093831
Mar. 30, 2007 (JP) ............................. 2007-094456
Mar. 30, 2007 (JP) ............................. 2007-095280

(51) Int. Cl.
  *B62K 11/12* (2006.01)
(52) U.S. Cl. ..................................... 180/219
(58) Field of Classification Search ................... 180/219
  See application file for complete search history.

(56) References Cited

U.S. PATENT DOCUMENTS 4,807,898 A * 2/1989 Huntly ....................... 280/276
5,645,279 A * 7/1997 Reutlinger ................. 273/249
5,810,383 A * 9/1998 Anderson ............. 280/124.116
6,238,017 B1 * 5/2001 Eitel ........................... 303/137
6,263,994 B1 * 7/2001 Eitel ........................... 180/219
6,349,784 B1 * 2/2002 van der Heide ............. 180/219
6,547,027 B1 * 4/2003 Kalhok et al. ............... 180/312
2006/0151968 A1 * 7/2006 Kim ....................... 280/86.757

FOREIGN PATENT DOCUMENTS

JP  2002-500133  1/2002
WO  99/35028  7/1999

* cited by examiner

*Primary Examiner*—Lesley Morris
*Assistant Examiner*—Michael R Stabley
(74) *Attorney, Agent, or Firm*—Rankin, Hill & Clark LLP

(57) ABSTRACT

A motorcycle includes a front part having a steering mechanism with which a front wheel is steered based on the manipulation of the steering of a steering handle, and a swing mechanism extending from either a body frame and an engine for vertically movably supporting the steering mechanism. The steering mechanism is connected to the swing mechanism via a lower spherical bearing and an upper spherical bearing.

14 Claims, 17 Drawing Sheets

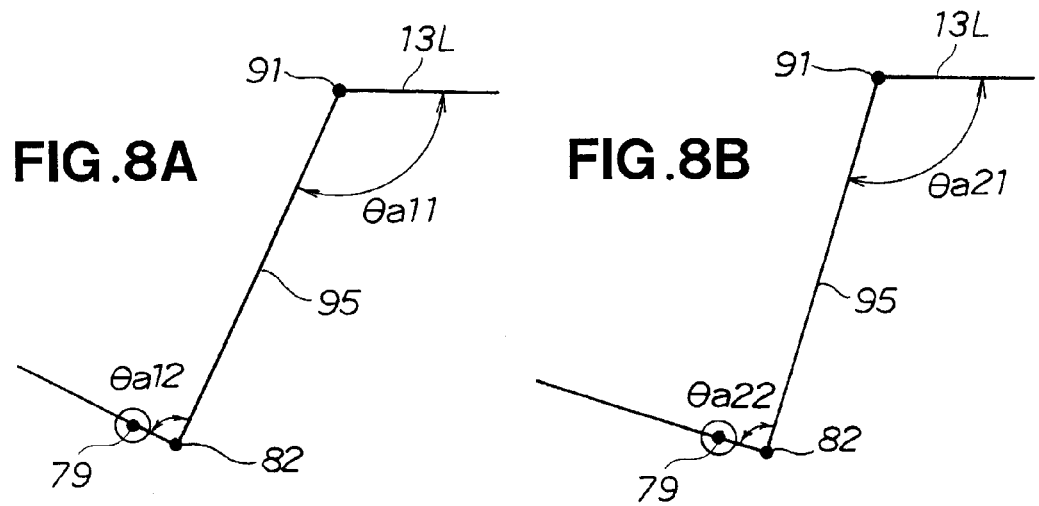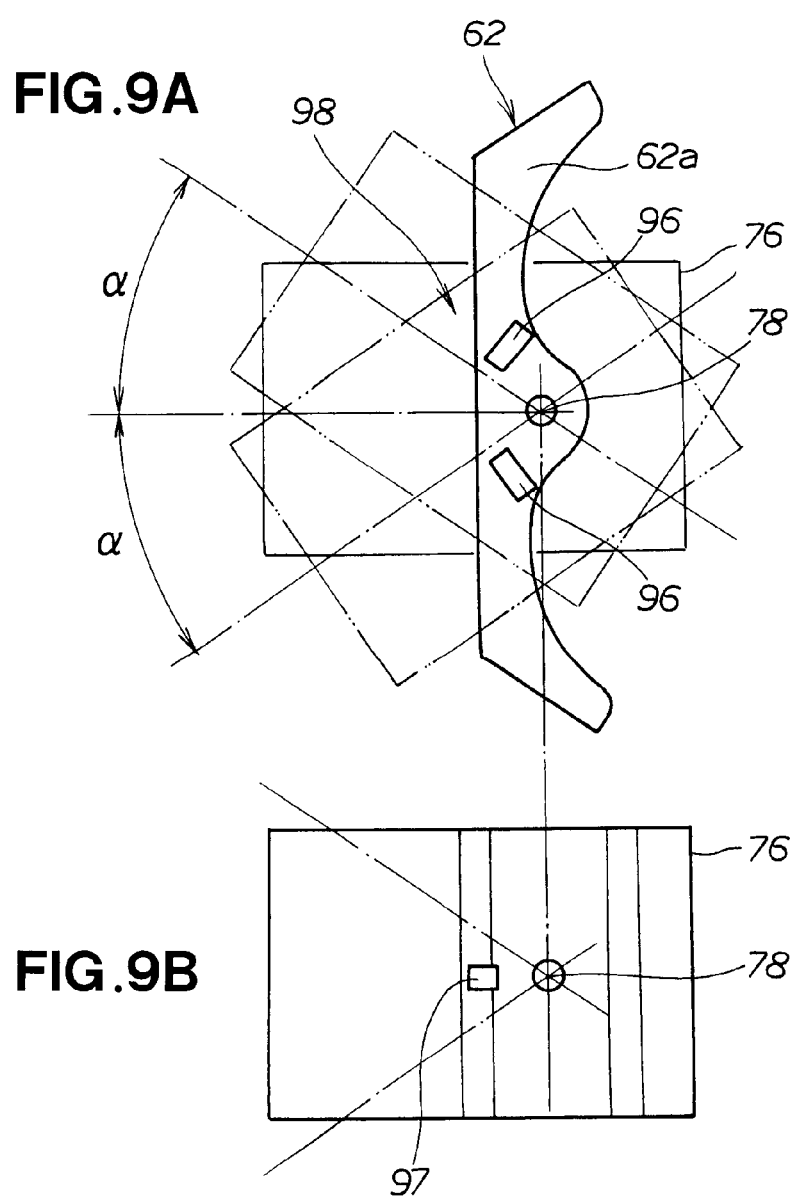

MOTORCYCLE

FIELD OF THE INVENTION

The present invention relates to a motorcycle including a steering mechanism for steering a front wheel and a swinging mechanism extending from a body frame or an engine, for vertically movably supporting the steering mechanism.

BACKGROUND OF THE INVENTION

A motorcycle in which a front wheel is attached by a swing arm to a body frame is disclosed in JP 2002-500133 A. Main portions of the motorcycle will be described below with reference to FIGS. 19 and 20 hereof.

As shown in FIG. 19, in the motorcycle 200, a lower swing arm 203 and a middle swing arm 204 extend frontward from a body frame 201 or an engine 202. A distal end of the lower swing arm 203 and a distal end of the middle swing arm 204 are connected by V-shaped plates 205.

A steering handle 208 is fitted in a head pipe 207 that is provided at a front part of the body frame 201. A handle link 209 that is capable of vertically bending is connected to a lower end of the steering handle 208. A knuckle arm 210 is connected to a lower end of the handle link 209. The knuckle arm 210 is a member for directly steering (pivoting) a front wheel 211.

An upper swing arm 212 extends frontward from the body frame 201, and an upper part of the knuckle arm 210 is connected to a distal end of the upper swing arm 212.

As shown in FIG. 20, the front wheel 211 comprises a tire 214; a rim 215 for directly supporting the tire 214; spokes 216 extending from the rim 215; and a hub 217 connected to the spokes 216.

A hub body 219 is accommodated within the hub 217 via an axle bearing 218 so as to be capable of relative rotation. A pivot pin 221 extending from an axle 220 is fitted into the hub body 219. A lower end of the knuckle arm 210 is connected to the hub body 219.

A spline 222 is formed in an end part of the axle 220. A coupling 223 is fitted onto the spline 222 and secured to the V-shaped plates 205. The distal end of the upper swing arm 212 is connected to the knuckle arm 210 via a ball bearing 224.

The pivot pin 221 is stationary in the Figure because the axle 220 is secured by the V-shaped plates 205, 205. The hub body 219 rotates about the pivot pin 221, whereby the front wheel 211 is steered. The front wheel 211 rotates about the pivot pin 221 and about the axle 220.

In FIG. 19, the length of the upper swing arm 212 changes when the lower swing arm 203 and the middle swing arm 204 swing together in the vertical direction. Specifically, the distance between a pin 225 provided on the body frame 201 and the ball bearing 224 provided in the knuckle arm 210 changes. The upper swing arm 212 is connected to the pin 225 via an intermediate pin 226 and an auxiliary link 227 in order for such changes in distance to be addressed.

As is evident from the description above, the motorcycle 200 must be provided with the lower swing arm 203, the middle swing arm 204, the upper swing arm 212, the intermediate pin 226, and the auxiliary link 227. Problems therefore arise in that the structure of the motorcycle 200 is complex, and costs associated with the manufacture of the motorcycle 200 are high.

A demand has accordingly arisen for a motorcycle having a front wheel attached to a body frame using swing arms to have a simpler structure that allows manufacturing costs to be lowered.

SUMMARY OF THE INVENTION

According to the present invention, there is proposed a motorcycle having a steering mechanism for steering a front wheel through manipulation of a steering handle, and a swing mechanism extending from one of a body frame and an engine for vertically movably supporting the steering mechanism, wherein the steering mechanism comprises: a hub body for rotatably supporting the front wheel; knuckle arms extending upwardly from the hub body; a handle link connected to an upper end of the knuckle arms and being capable of bending vertically; and the steering handle provided on an upper end of the handle link, and wherein the swing mechanism comprises lower swing arms vertically swingably connected to one of the body frame and the engine and extending to the hub body; a cross-member provided on distal ends of the lower swing arms and passing through the hub body; a lower spherical bearing provided on the cross-member for three-dimensionally rotatably supporting the hub body; upper swing arms vertically swingably connected to one of the body frame and the engine and extending to upper parts of the knuckle arms; and an upper spherical bearing provided on distal ends of the upper swing arms for three-dimensionally swingably supporting the knuckle arms.

The hub body is three-dimensionally rotatably supported by the lower spherical bearing on the distal end of the lower swing arm that extends from the body frame or the engine. The front wheel can therefore be steered.

The front wheel is steered via the steering handle, the handle link, and the knuckle arm. Among these, the knuckle arm, which is connected to the hub body, is three-dimensionally rotatably supported by the upper spherical bearing on the distal end of the upper swing arm that extends from the body frame or the engine. The knuckle arm can therefore be steered.

Using the lower spherical bearing and the upper spherical bearing allows merely a lower swing arm and an upper swing arm to be used. In other words, in a motorcycle in which a front wheel is attached to a body frame by a swing arm, it is possible to provide a structure in which the structure is simplified and manufacturing costs can be reduced.

Preferably, the ball bearing is disposed between a hub of the front wheel and the hub body. The ball bearing is disposed between the hub body, which is a non-rotating member, and the hub, which is a rotating member. Accordingly, the hub can spin smoothly, and frictional resistance can be reduced.

Desirably, an inside diameter of the hub body is set to be larger than an outside diameter of the cross-member. Accordingly, the cross-member can be incorporated with the hub body, and the outward appearance of the hub periphery can be improved.

It is desirable that the knuckle arms are detachably fastened to the hub body by a first fastening member, the lower swing arms are detachably fastened to the cross-member by a second fastening member, and the first fastening member and the second fastening member extend parallel to the cross-member. When a tire is changed, the front wheel must be removed from the lower swing arm. In this case, the first fastening member is loosened, whereby the knuckle arm is separated from the hub body. Next, the second fastening member is loosened, whereby the cross-member is separated from the lower swing arm. The front wheel can thereby be removed.

The first fastening member and the second fastening member extend parallel to the cross-member. The operation of loosening the first fastening member and the second fastening member can therefore be performed from the side of the vehicle body. Accordingly, the operation of removing the front wheel is greatly facilitated.

BRIEF DESCRIPTION OF THE DRAWINGS

Certain preferred embodiments of the present invention will be described in detail below, by way of example only, with reference to the accompanying drawings, in which:

FIGS. 8A and 8B are diagrams showing an operation of a lower spherical bearing and an upper spherical bearing;

FIGS. 9A and 9B are diagrams illustrating a steering stopper;

DETAILED DESCRIPTION OF THE PREFERRED EMBODIMENTS

An overall structure of the motorcycle will be described with reference to FIGS. 1 and 2.

Figure 1:
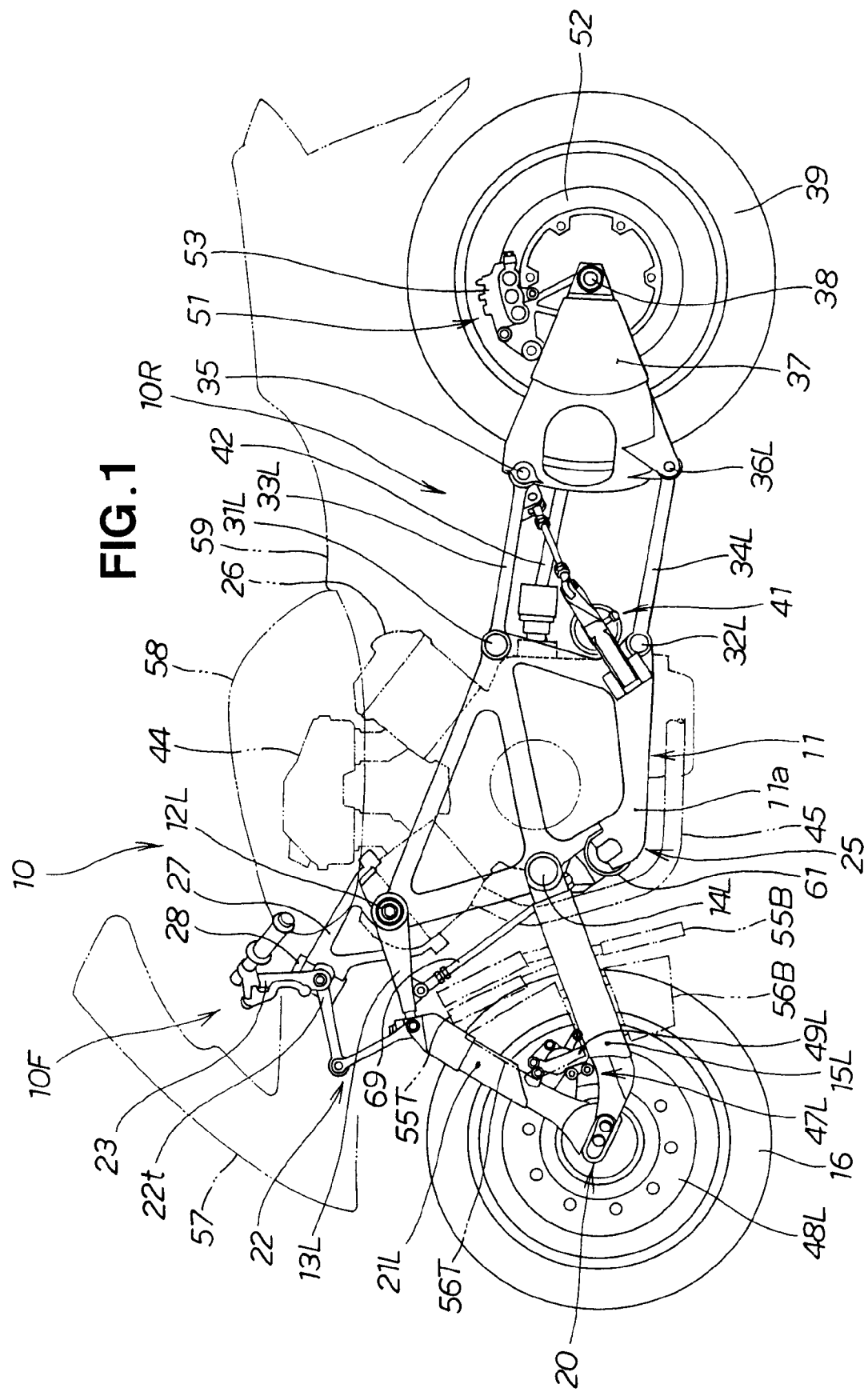
FIG. 1 is a left side view of a motorcycle according to the present invention.

As shown in FIG. 1, disposed in a front part 10F of a motorcycle 10 are main frames 11a as constituent elements of a body frame 11; an upper swing arm 13L that extends forward from an upper part of the main frames 11a, and that is swingably supported in a vertical direction by an upper front swing shaft 12L; a lower swing arm 15L that extends forward from a lower part of the main frames 11a, and that is swingably supported in a vertical direction by a lower front swing shaft 14L so as to be capable of swinging in the vertical direction; a hub steering mechanism 20 that is provided to a distal end of the lower swing arm 15L, and that steerably supports a front wheel 16; a knuckle arm 21L that is provided above the hub steering mechanism 20, and that steerably supports the front wheel 16; a handle link 22 that is attached to an upper end part of the knuckle arm 21L, and that is capable of bending in a vertical direction; a steering handle 23 that is attached to an upper end part 22t of the handle link 22, and that is steered by a rider; and a front part cushioning mechanism 25 that is provided between the upper swing arm 13L and the main frames 11a, and that absorbs force applied to the front wheel 16.

The hub steering mechanism 20 is defined as a construction in which a mechanism that allows the wheel to pivot is provided to the wheel hub.

Figure 2:
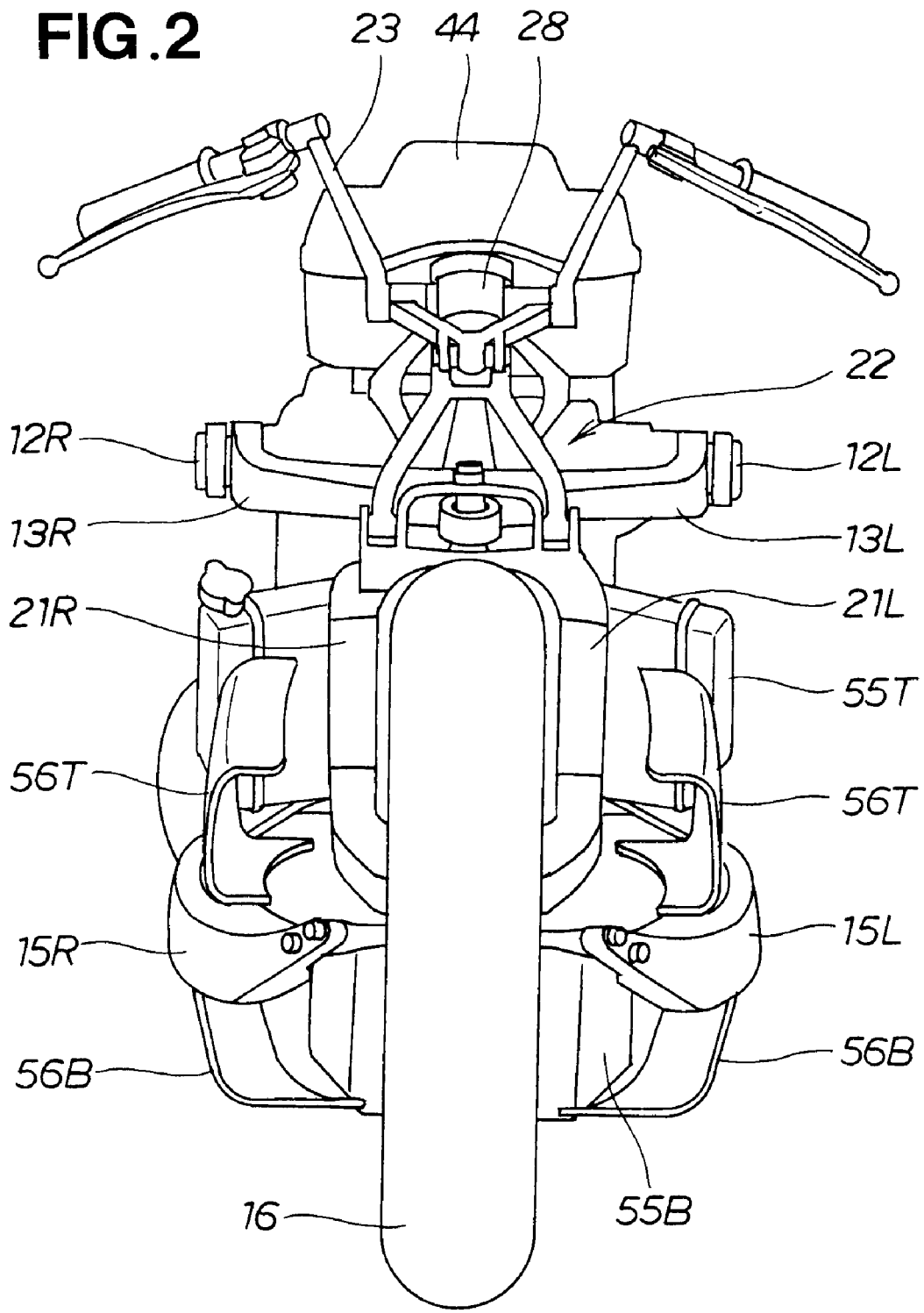
FIG. 2 is a front view of the motorcycle.

As shown in FIG. 2, an upper front pivot shaft 12R is disposed so as to form a pair with the upper front swing shaft 12L. An upper swing arm 13R, a lower swing arm 15R, and a knuckle arm 21R are similarly disposed.

As shown in FIG. 1, a handle support frame 27 extends forward from an engine 26. A head pipe 28 is attached to a front end part of the handle support frame 27, and a steering handle 23 is rotatably attached to the head pipe 28.

A handle link 22 is connected between the knuckle arm 21L and the steering handle 23, and the knuckle arm 21L is capable of moving in the vertical direction. Specifically, a force applied to the knuckle arm 21L is not directly transmitted to the steering handle 23 as a result of the handle link 22 being disposed therebetween. Accordingly, it is possible to reduce the weight of the handle support frame 27.

Disposed in a rear portion 10R of the motorcycle 10 are upper and lower arm members 33L, 34L that extend rearward from the main frames 11a, and that are connected to the main frames 11a by upper and lower pivot shafts 31L, 32L so as to be capable of swinging upward and downward; an arm body 37 that extends rearward from rear end parts of the upper and lower arm members 33L, 34L, and that is swingably connected by rear support shafts 35, 36L; a rear wheel 39 that is rotatably attached to a rear end part of the arm body 37 via a rear axle 38; and a rear cushioning mechanism 41 that is provided between the arm body 37 and the main frames 11a, and that absorbs force applied to the rear wheel 39.

The upper arm member 33L extends from an upper part of a rear end part of the main frames 11a, and the lower arm member 34L extends from a lower part of the rear end part of the main frames 11a.

The engine 26 is suspended on the main frames 11a as a drive source, and a driveshaft 42, which drives the rear wheel 39, extends from a rear end part of the engine 26.

The engine 26 is provided with an air cleaner 44 as a constituent element of an intake system; and an exhaust pipe 45, which is a constituent element of an exhaust system, and through which exhaust gas of the engine 26 passes.

A front disc brake 47L is attached to the front wheel 16. The front disc brake 47L comprises a front wheel brake disc 48L that is attached to the front wheel 16; and a front wheel disc caliper 49L that is attached to the knuckle arm 21L, and that clamps the front wheel brake disc 48L during braking.

A rear disc brake 51 is attached to the rear wheel 39. The rear disc brake 51 comprises a rear wheel brake disc 52 that is attached to the rear wheel 39; and a rear wheel disc caliper 53 that is attached to the arm body 37, and that sandwiches the rear wheel brake disc 52 during braking.

Two upper and lower radiators 55T, 55B that are vertically disposed and that cool the engine 26 are provided between the engine 26 and the front wheel 16. The upper radiator 55T is disposed between the upper swing arm 13L and the lower swing arm 15L. The lower radiator 55B is disposed below the lower swing arm 15L.

Upper and lower ducts 56T, 56B for guiding suctioned air to the radiators 55T, 55B are provided in front of the upper and lower radiators 55T, 55B. The upper and lower radiators 55T, 55B and the upper and lower ducts 56T, 56B are attached to the lower swing arm 15L. A front cowling 57 indicated by an imaginary line is disposed in front of the steering handle 23. A fuel tank 58 is disposed rearward of the steering handle 23. A seat 59 is disposed rearward of the fuel tank 58.

Specifically, the body frame 11 and the front wheel 16 are connected by four arms, comprising the upper swing arms 13L, 13R (see FIG. 2) and the lower swing arms 15L, 15R (see FIG. 2). Accordingly, a space can be maintained in front of the engine 26. Ensuring that this space is present allows the components to be disposed with a greater degree of latitude. For example, the upper and lower radiators 55T, 55B can be disposed in this space. The two radiators 55T, 55B enable adequately robust cooling performance to be demonstrated.

In the present embodiment, the engine 26 is a V-type engine in which cylinders are disposed in a V-shape. However, the engine 26 may also be an in-line engine in which cylinders are disposed in a row. The engine is in a so-called transverse layout in which a crankshaft is disposed in a width direction of the vehicle. However, the engine may also have a so-called vertical layout in which the crankshaft is disposed in the longitudinal direction of the vehicle. The engine is not limited to being cooled by water, and may also be cooled by air. In other words, the type and layout of the engine are not limited to the embodiments, and can be configured as required.

A front cushioning unit 61 for absorbing force is provided to the front cushioning mechanism 25. The exhaust pipe 45 through which exhaust gas of the engine 26 passes is disposed externally with respect to the front cushioning unit 61.

The exhaust pipe 45 through which exhaust gas of the engine 26 passes is disposed externally with respect to, or in front of, the front cushioning unit 61. The exhaust pipe 45 also serves to protect the expensive front cushioning unit 61.

The structure of the front part 10F of the motorcycle 10 will be described in detail below with reference to the drawings.

Figure 3:
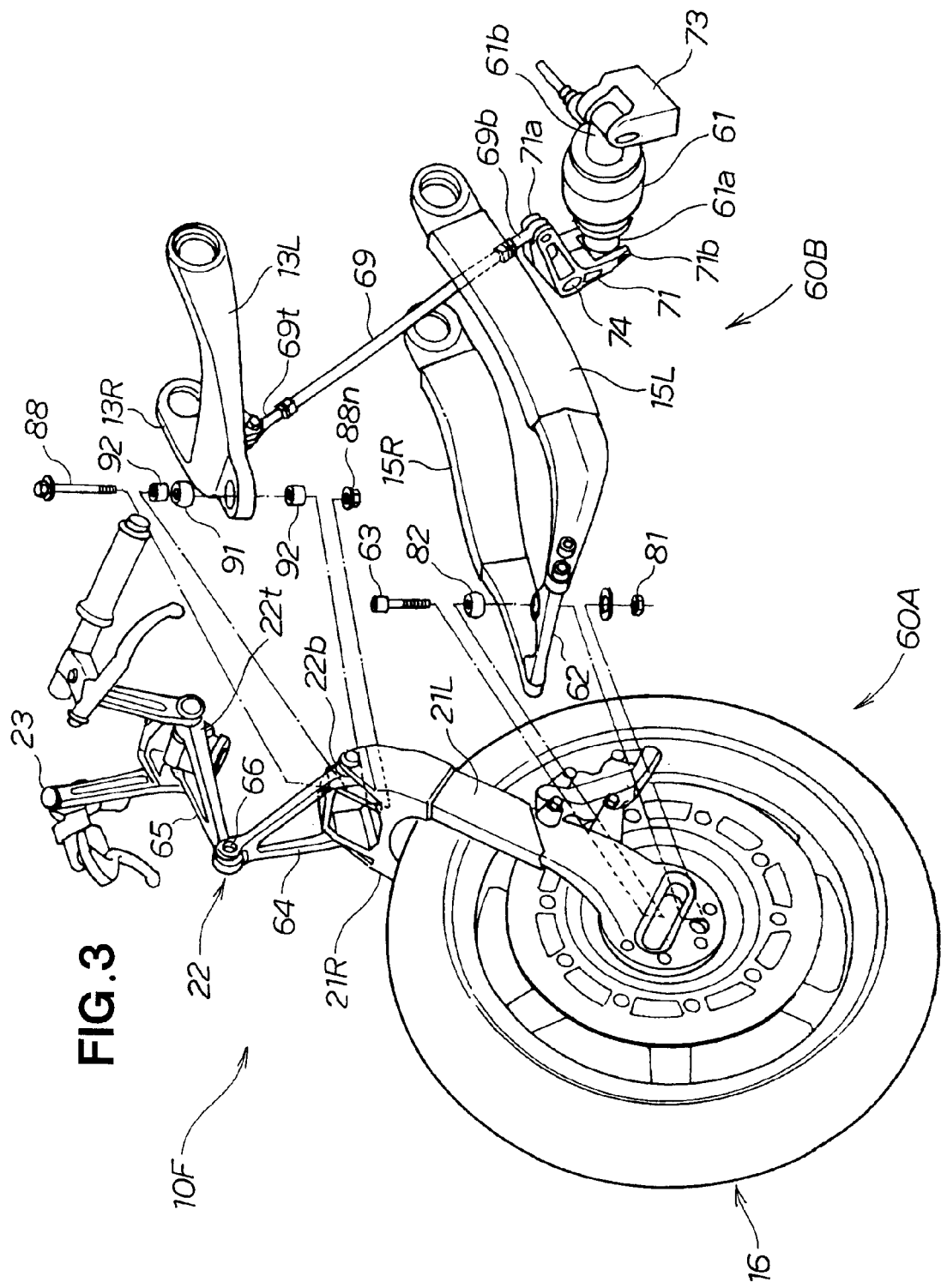
FIG. 3 is an exploded view of a front part of the motorcycle.

As shown in FIG. 3, the front part 10F of the motorcycle comprises a steering mechanism 60A by which the front wheel 16 is steered on the basis of the operation of the steering handle 23; and a swing mechanism 60B, which extends from the body frame or the engine, and which is supported on the steering mechanism 60A so as to be capable of moving in the vertical direction.

The steering mechanism 60A comprises a hub body 76 (see FIG. 6) that rotatably supports the front wheel 16; knuckle arms 21L, 21R that extend upward from the hub body 76; the handle link 22 that is connected to upper ends of the knuckle arms 21L, 21R, and that is capable of bending in the vertical direction; and the steering handle 23 that is provided to an upper end of the handle link 22.

The swing mechanism 60B comprises the lower swing arms 15L, 15R that are connected to the body frame or the engine so as to be capable of rotating in the vertical direction, and that extend to the hub body 76 (see FIG. 6); a cross-member 62 that is provided to distal ends of lower swing arms 15L, 15R, and that passes through the hub body 76; a lower spherical bearing 82 that is provided to the cross-member 62, and that three-dimensionally and rotatably supports the hub body 76; the upper swing arms 13L, 13R that are connected to the body frame or the engine so as to be capable of rotating in the vertical direction, and that extend to an upper part of the knuckle arms 21L, 21R; and an upper spherical bearing 91 that is provided to distal ends of the upper swing arms 13L, 13R, and that three-dimensionally and rotatably supports the knuckle arms 21L, 21R. The cross-member 62 preferably extends across the pair of lower swing arms 15L, 15R, but may also extend from only the lower swing arm 15L or only the lower swing arm 15R. In cases where there is only one lower swing arm, the cross-member 62 extends from the one lower swing arm.

The handle link 22 comprises a lower link arm 64 and an upper link arm 66, where the upper link arm 66 is connected to the lower link arm 64 by a connecting pin 65. An upper end 22t is connected to the steering handle 23, and a lower end 22b is connected to the knuckle arm 21L.

An upper end part 69t of a rod member 69 is connected to a front part of the upper swing arms 13L, 13R. The rod member 69 extends downward at an angle, and a lower end 69b is connected to one end 71a of an L-shaped link 71. The other end 71b of the L-shaped link 71 is connected to a first end 61a of the front cushioning unit 61. A second end 61b of the front cushioning unit 61 is connected to the body frame or the engine via a cushioning bracket 73. An intermediate point 74 of the L-shaped link 71 is supported by the body frame or the engine.

Figure 4:
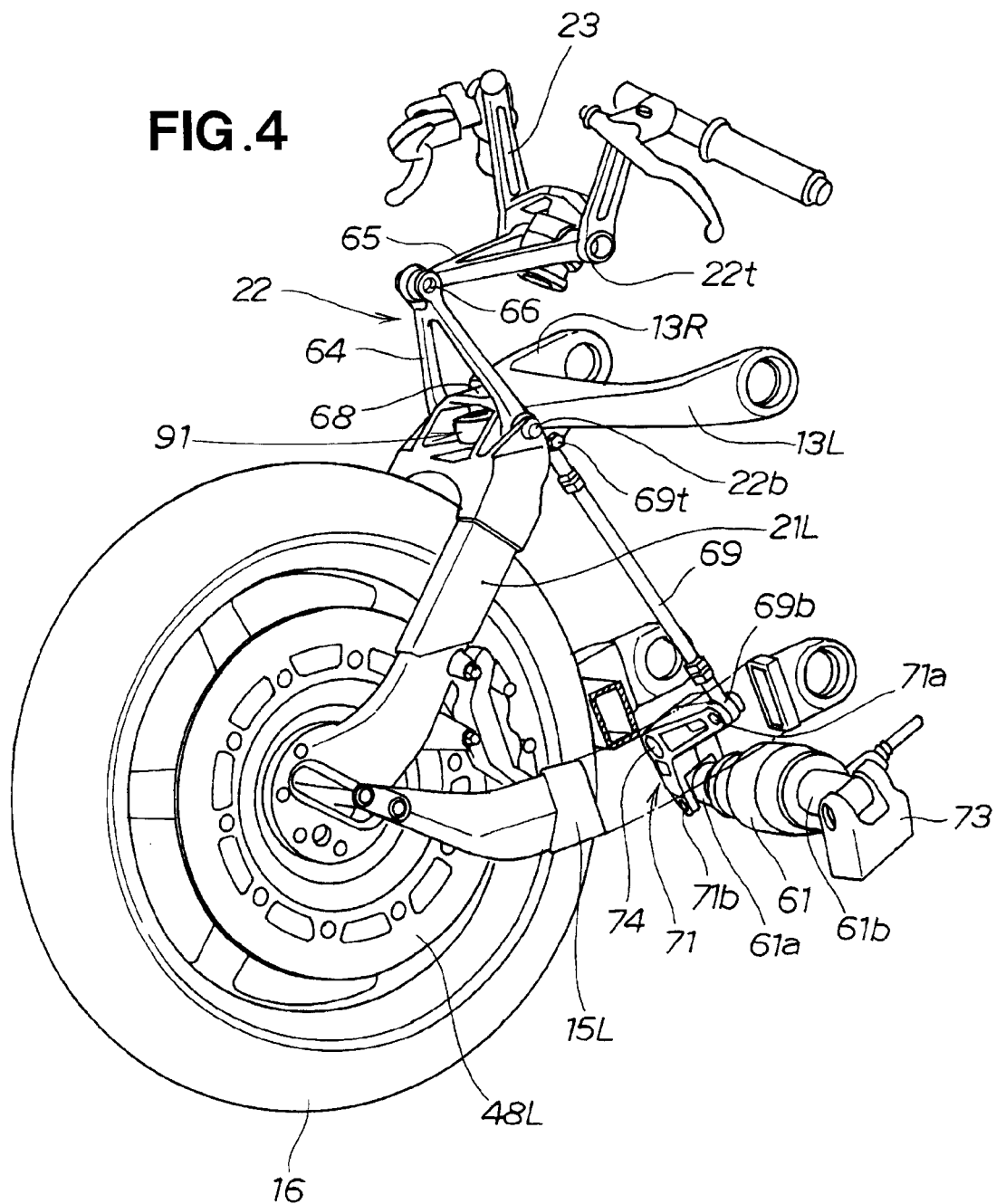
FIG. 4 is a perspective view of the front part of the motorcycle.

As shown in FIG. 4, the swing mechanism 60B is connected to the steering mechanism 60A.

Figure 5:
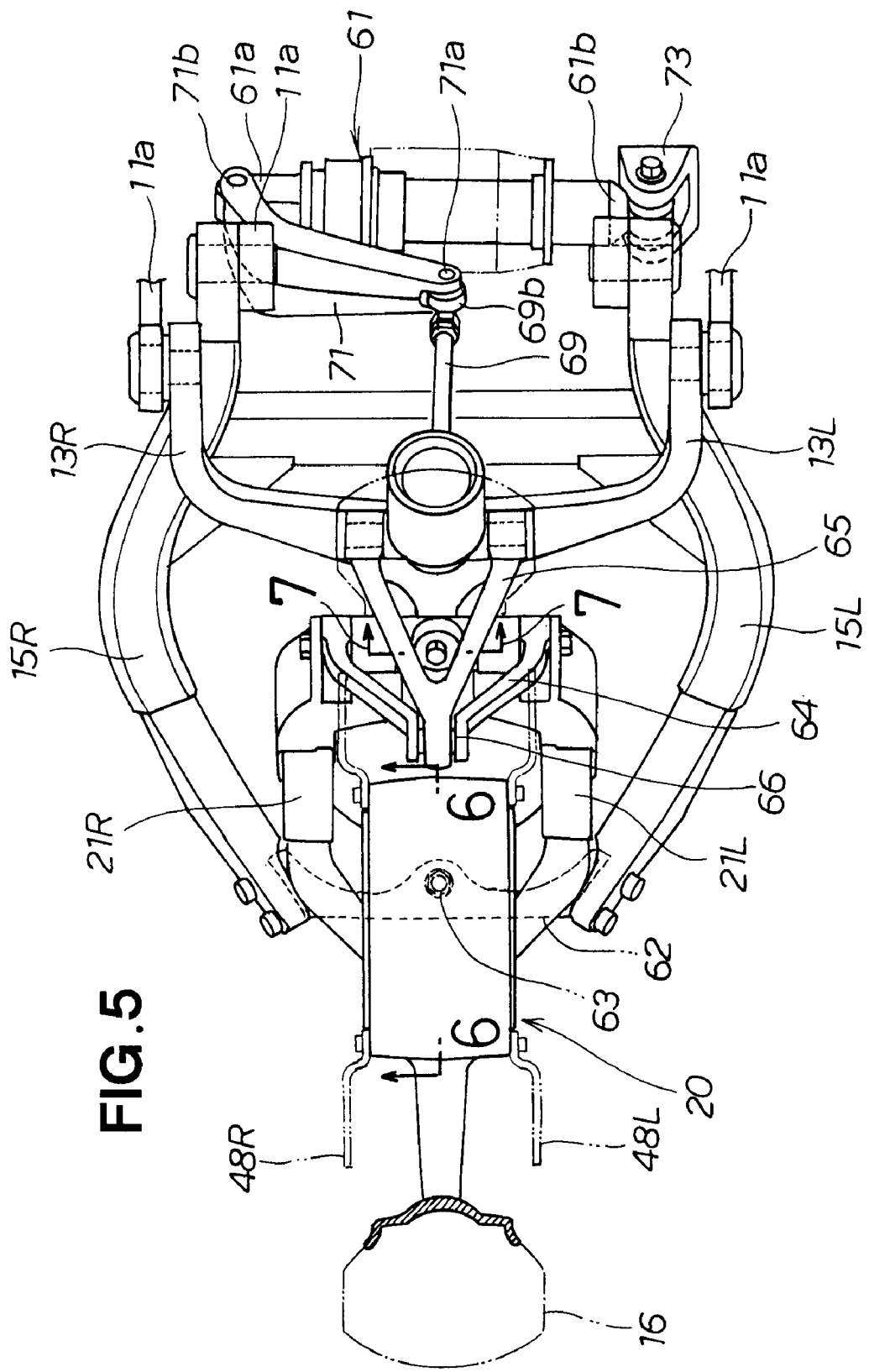
FIG. 5 is a top plan view of the front part of the motorcycle.

As shown in FIG. 5, the front cushioning unit 61 is disposed between the main frames 11a, 11a so as to extend along the width direction of the vehicle.

The lower swing arms 15L, 15R that are provided to the left and right are formed so as to protrude away from the vehicle in order to avoid interference with the brake disc or the like during steering.

The lower spherical bearing will be described below.

Figure 6:
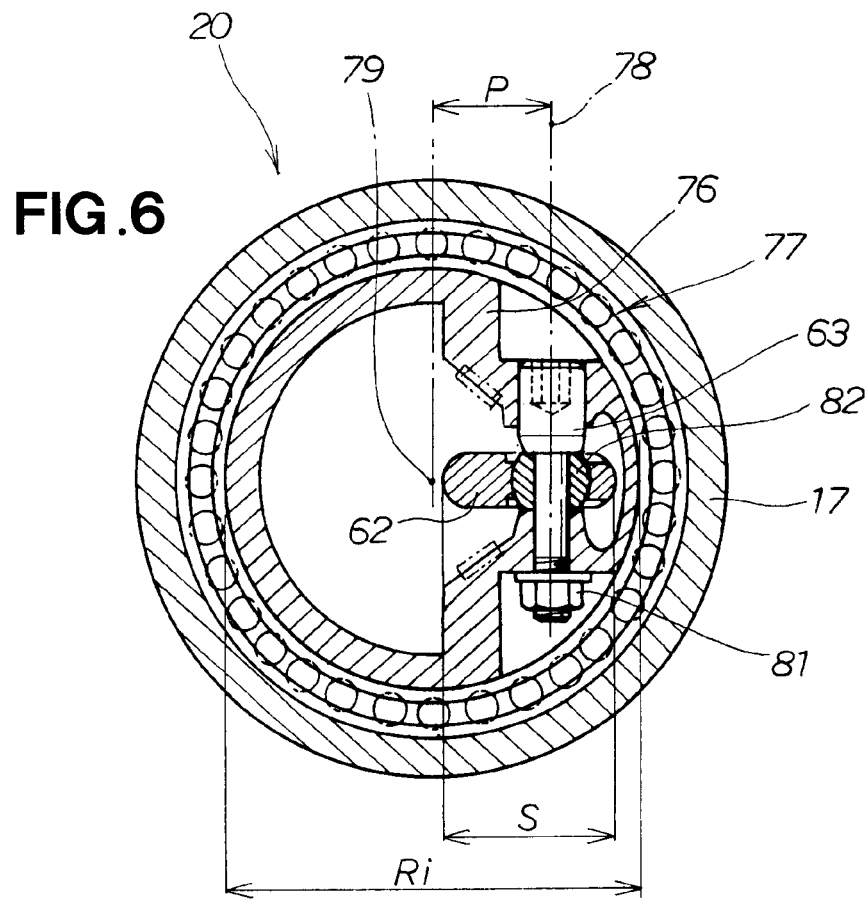
FIG. 6 is a sectional view taken along line 6-6 of FIG. 5.

As shown in FIG. 6, the hub body 76 is housed in the hub 17 of the front wheel via a ball bearing 77 as an axle bearing. The axle bearing may comprise a metal, and the ball bearing preferably has low rotational resistance. An inside diameter Ri of the ball bearing 77 is substantially larger than an outside diameter S of the cross-member 62.

Since the inside diameter Ri of the ball bearing 77 is larger than the size S of the cross-member 62, the load received from the front wheel 16 can be dispersed over a large surface area. Accordingly, the load of the ball bearing 77 can be reduced. Since the load is dispersed over a large surface area, the cooling performance of the ball bearing 77 increases, and the durability of the ball bearing 77 can be improved.

A lower steering shaft 63 is vertically inserted into the hub body 76 at a position that is set apart toward the rear of the vehicle body by a distance P from a center point 79 of the hub body. The lower spherical bearing 82 is attached partway along the lower steering shaft 63. An outer peripheral surface of the lower spherical bearing 82 is a spherical surface, and the spherical surface is rotatably fitted to the cross-member 62. The lower steering shaft 63 is secured in place by a nut 81, and the lower steering shaft 63 can be removed from the hub body 76 by loosening the nut 81.

The lower steering shaft 63 can be rotated across three dimensions by the operation of the lower spherical bearing 82, with the cross-member 62 as a reference. The center point 79 of the hub body 76 is offset from the center 78 of the lower steering shaft 63 by a distance of P. Accordingly, the hub body 76, the ball bearing 77, and the hub 17 can pivot together about the center 78.

The upper spherical bearing will be described below.

Figure 7:
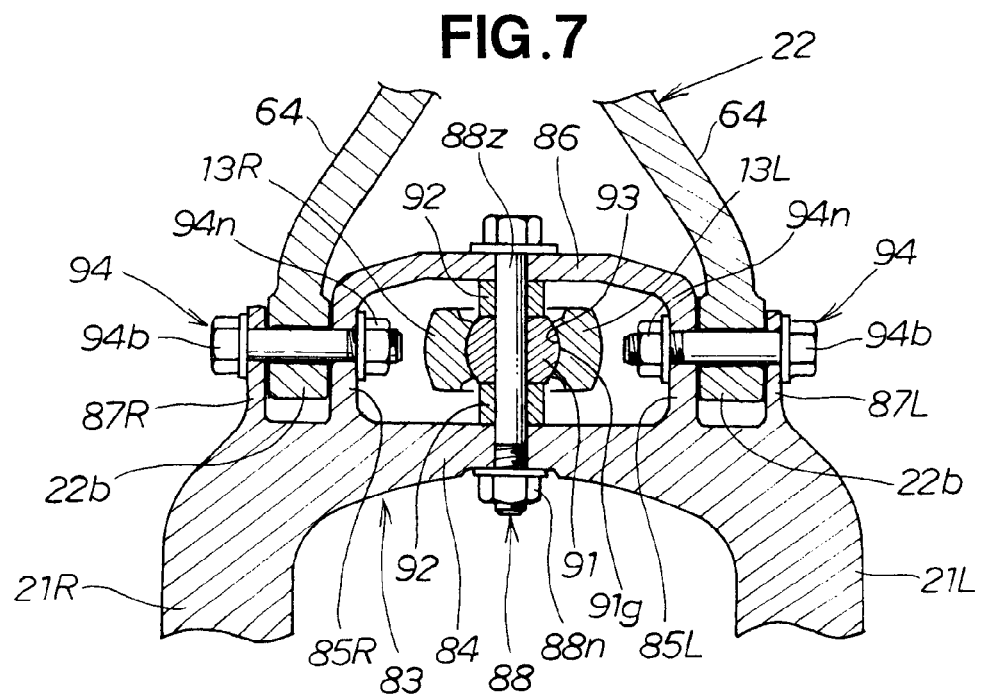
FIG. 7 is a sectional view taken along line 7-7 of FIG. 5.

As shown in FIG. 7, upper ends of the left and right knuckle arms 21L, 21R are connected by an arm connecting part 83. The arm connecting part 83 comprises a bottom part 84 in the center; left and right wall parts 85L, 85R that rise from the bottom part 84; a roof part 86 that covers the top parts of the wall parts 85L, 85R; and left and right outer wall parts 87L, 87R that are disposed below the left and right wall parts 85L, 85R, and that rise from the bottom part 84.

An upper steering shaft 88 is vertically oriented between the bottom part 84 and the roof part 86. The upper spherical bearing 91 is fitted onto the upper steering shaft 88, spacers 92, 92 for restricting the position of the upper spherical bearing 91 along the vertical direction are provided, and concave parts 93, which are formed on the distal ends of the upper swing arms 13L, 13R, are fitted on the outer surface 91g of the upper spherical bearing 91. The upper steering shaft 88 comprises a shaft part 88z and a nut part 88n.

The upper spherical bearing 91, the spacers 92, 92, the knuckle arms 21L, 21R, and the handle link 22 can rotate across three dimensions, with the upper swing arms 13L, 13R being used as a reference.

The operation of the lower spherical bearing 82 and the upper spherical bearing 91 will be described below.

As shown in FIG. 8A, an imaginary line that connects the lower spherical bearing 82 and the upper spherical bearing 91 represents a pivot shaft 95. When the front wheel is not being subjected to any force, the angle formed by the upper swing arm 13L and the pivot shaft 95 is θa11, and the angle formed by the line extending from the lower spherical bearing 82 to the center point 79 and the pivot shaft 95 is θa12.

When force is exerted on the front wheel, the angle θa12 changes to an angle θa22, as shown in FIG. 8B. In response to this change, the angle θa11 changes to an angle θa21. These changes are not limited to two-dimensional changes within the plane of the diagram, but may also be three-dimensional changes including the direction perpendicular to the plane of the diagram. This is because the lower spherical bearing 82 and the upper spherical bearing 91 are capable of changing along a spherical surface. The lower spherical bearing 82 and the upper spherical bearing 91 are capable of changing over three dimensions independently of one another. Accordingly, the lower steering shaft 63 does not need to be aligned with the pivot shaft 95, and the upper steering shaft 88 does not need to be aligned with the pivot shaft 95.

Figure 19:
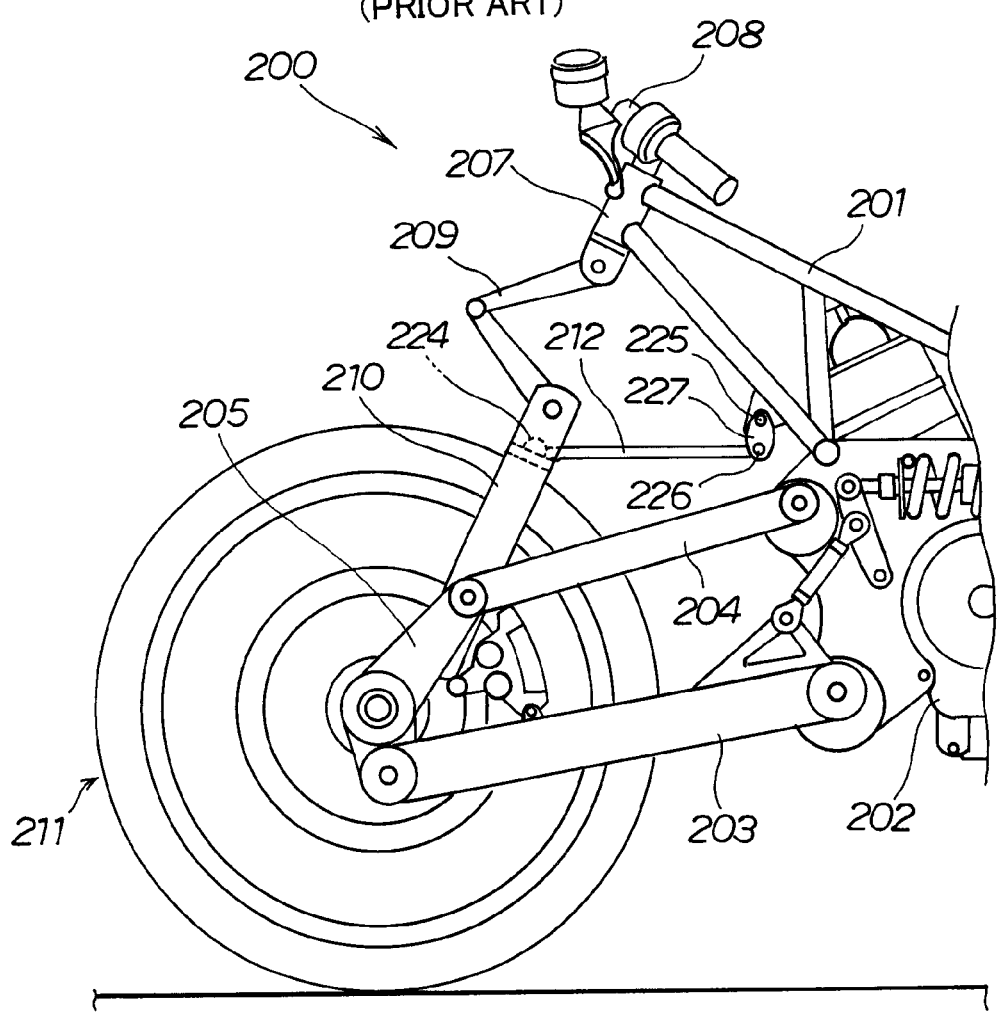
FIG. 19 is a left side view of a conventional motorcycle.
Figure 20:
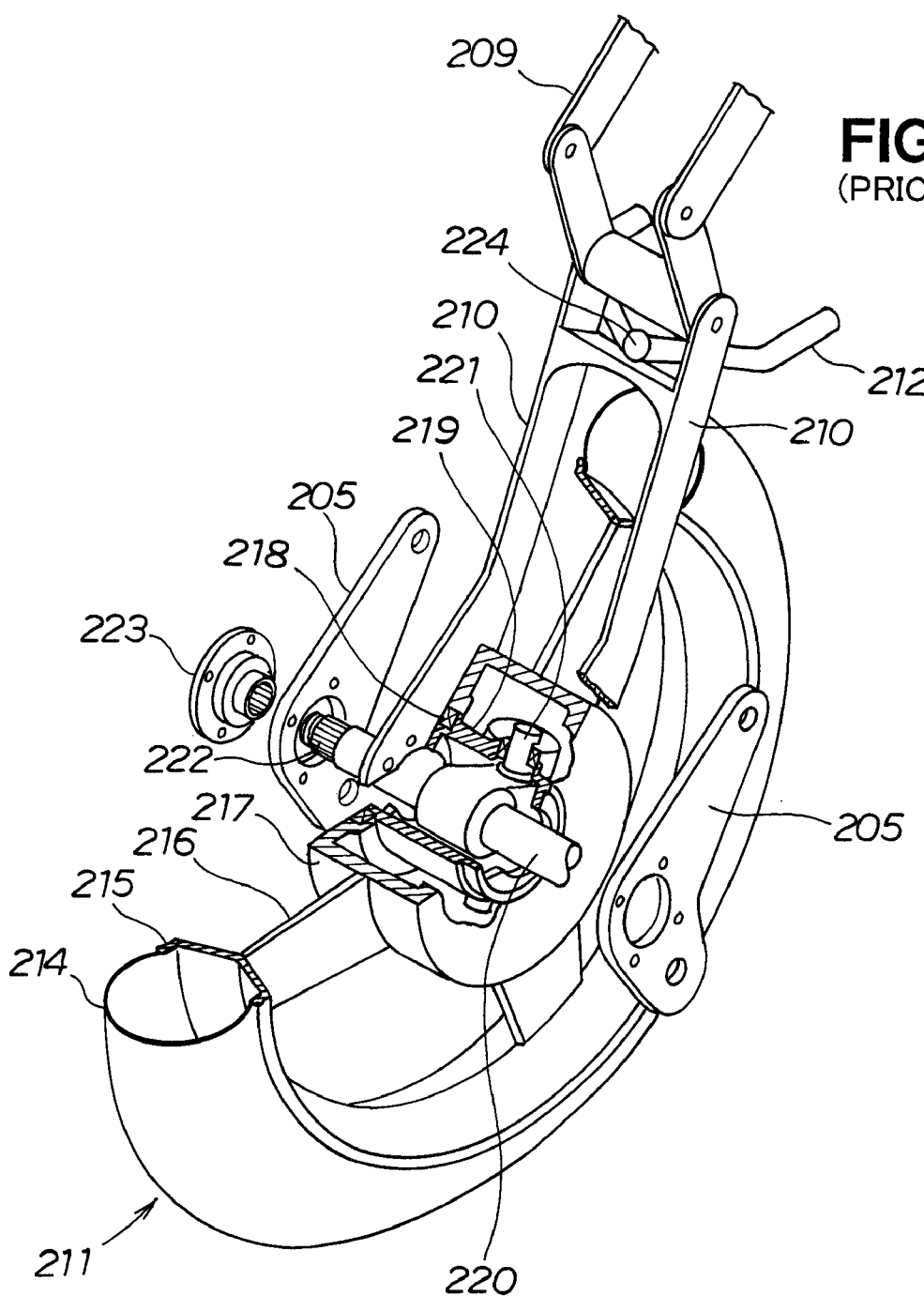
FIG. 20 is a perspective view of a front wheel of the conventional motorcycle.

The prior art shown in FIG. 19 must have a lower swing arm 203, a middle swing arm 204, an upper swing arm 212, a middle pin 226, and an auxiliary link 227. By contrast, and as shown in FIG. 1, only the lower swing arm 15L and the upper swing arm 13L are needed in the present invention. In other words, according to the present invention, the middle swing arm 204, the middle pin 226, and the auxiliary link 227 are unnecessary. As a result, in a motorcycle in which a front wheel is attached to a body frame by a swing arm, it is possible to provide a structure in which the structure is simplified and manufacturing costs can be reduced.

The steering stopper will be described below.

As shown in FIG. 9A, stopper parts 96, 96 are provided to an upper surface 62a of the cross-member 62. The stopper parts 96, 96 restrict the steering angle of the hub body 76 so as not to exceed α on one side. As shown in FIG. 9B, a pin part 97 is provided to the hub body 76, and the pin part comes in contact with the stopper parts 96, 96.

Specifically, a steering stopper 98 is incorporated with the hub steering mechanism 20 (see FIG. 6). The steering stopper comprises the stopper parts 96, 96, and the pin part 97.

A steering stopper is normally disposed to the exterior of the hub steering mechanism 20. When the steering stopper is incorporated with the hub steering mechanism 20, the outward appearance is better than in a case when the steering stopper is disposed on the outside. Additionally, the cross-member 62 and the hub body 76 are advantageously used, making it possible to prevent the number of components from increasing.

The process for removing the front wheel in order to change the tire or the like will be described below.

Figure 10:
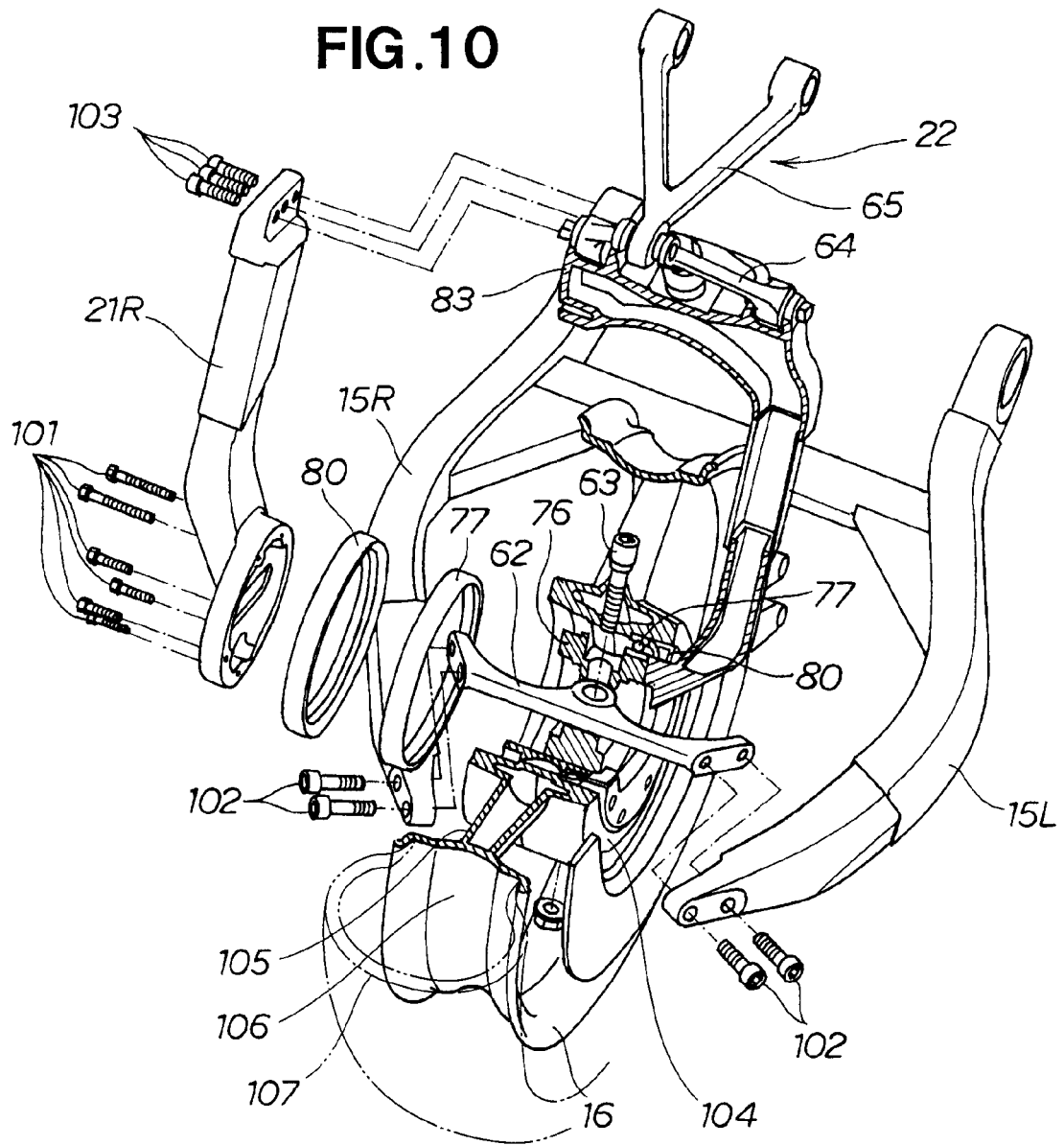
FIG. 10 is an exploded view illustrating an operation of changing a tire.

As shown in FIG. 10, a first fastening member 101, which is disposed on a lower part of the knuckle arm 21R, is loosened. The lower part of the knuckle arm 21R is then removed from the hub body 76. A seal member 80 is also removed.

A third fastening member 103, which is disposed on an upper part of the knuckle arm 21R, is loosened. The upper part of the knuckle arm 21R is then removed from the arm connecting part 83. The knuckle 21R is thus completely removed.

A second fastening member 102, which is disposed on the distal ends of the lower swing arms 15L, 15R, is then loosened. The cross-member 62 can thereby be separated from the lower swing arms 15L, 15R. The hub body 76, the ball bearing 77, the hub 104, the spokes 105, the rim 106, and the tire 107 can then be lowered together with the cross-member 62. The cross-member 62 and the like are thereby completely removed from the lower swing arms 15L, 15R.

The tire 107 is then removed from the rim 106, and replaced with a new tire. The restoration work may also be performed in the reverse order relative to that described above.

As is clear from the drawings, first through third fastening members 101 through 103 extend along the width direction of the vehicle, i.e., the longitudinal direction of the cross-member 62. Accordingly, the first through third fastening members 101 through 103 can be rotated or otherwise manipulated from the side of the vehicle body. As a result, changing the tire and other work can be readily carried out.

The operation of the front cushioning unit will be described below with reference to FIGS. 11A and 11B.

Figure 11A:
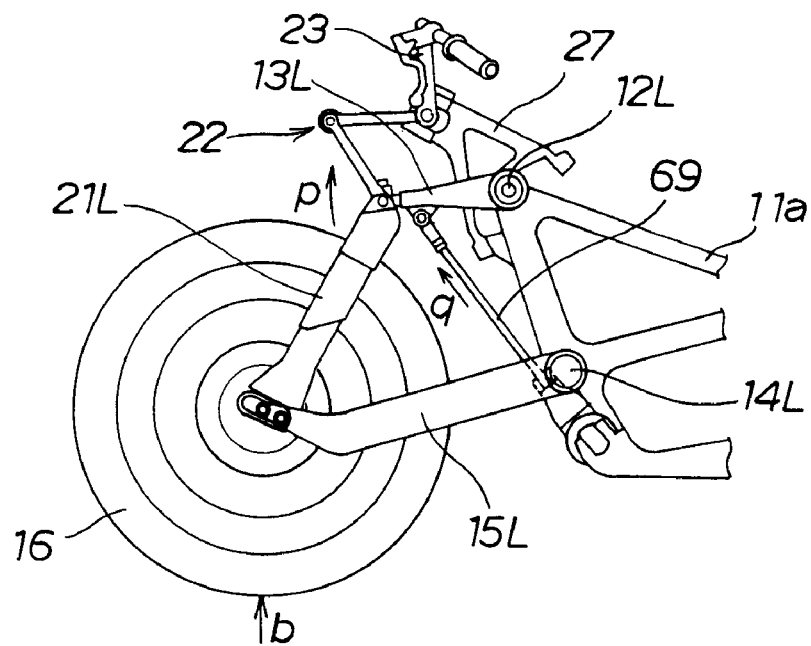
FIGS. 11A and 11B are schematic views showing an operation of a front cushioning unit.

As shown in FIG. 11A, when force is applied to the front wheel 16 in the direction of the arrow b, force is applied to the knuckle arm 21L in the direction of the arrow p. The upper swing arm 13L swings about the upper front swing shaft 12L, and the lower swing arm 15L swings about the lower front swing shaft 14L. At this time, force is applied to the rod member 69 in the direction of the arrow q.

Figure 11B:
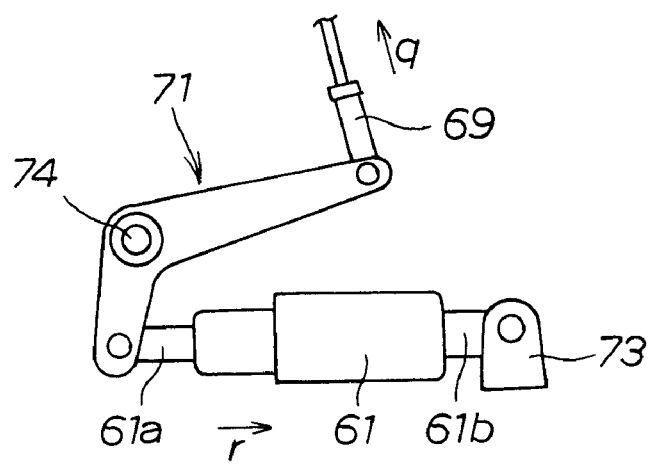

As a result, as shown in FIG. 11B, since force is applied to the rod member 69 in the direction of the arrow q, force is applied via the L-shaped link 71 so as to cause the front cushioning unit 61 to retract in the direction of the arrow r. The front cushioning unit 61 absorbs compression force.

The front cushioning unit 61 is disposed in a direction that is rotated about 90° from the direction in which the rider is seated; i.e., so as to be parallel to the width direction of the vehicle. The force applied to the front wheel 16 is altered substantially 90° by the L-shaped link 71, and is applied in the width direction of the vehicle. When the force applied to the front wheel 16 is altered substantially 90° as opposed to being directly applied to the rider, the effect of the force exerted on the rider will be lessened. As a result, the maneuverability of the vehicle can be further improved.

The relationship of the upper swing arm and the upper cushioning unit will be described below.

Figure 12:
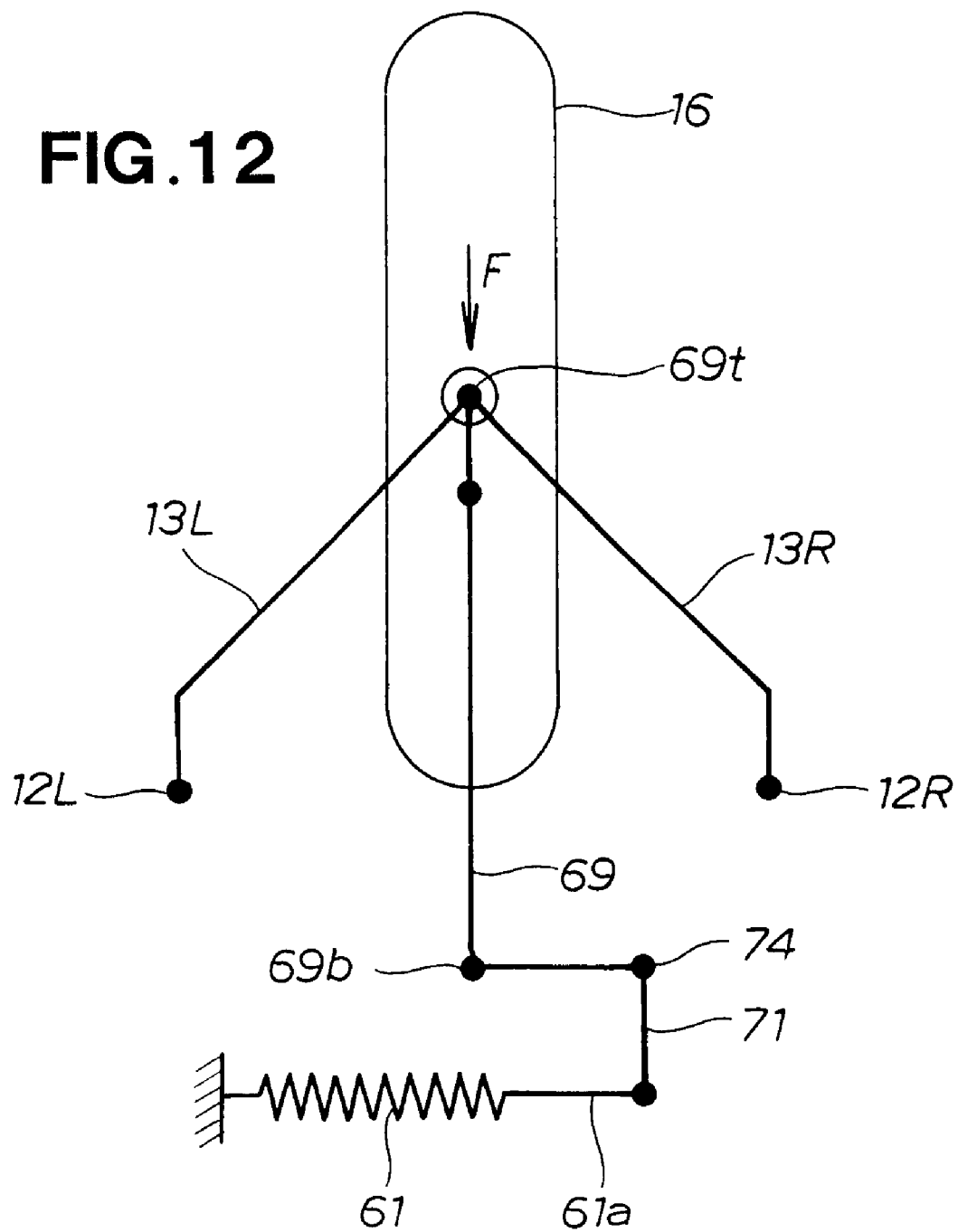
FIG. 12 is a diagram showing a relationship between an upper swing arm and the front cushioning unit.

As shown in FIG. 12, the upper end part 69t of the rod member 69 is connected to the center of the substantially V-shape formed by the upper swing arms 13L, 13R. Accordingly, the force F applied to the upper swing arms 13L, 13R is applied to the center of the vehicle. The lower end part 69b of the rod member 69 is connected to the L-shaped link 71. Accordingly, the force F is transmitted to the front cushioning unit 61 by the rod member 69. In this case, the force F applied to the upper swing arms 13L, 13R is applied to the center of the vehicle; therefore, the force F can be absorbed substantially equally to the left and right.

The upper swing arms 13L, 13R form a substantial V-shape as viewed from above, are disposed in a left-right symmetrical relationship in the width direction of the vehicle, and are subjected to a force (or a load) in the center of the V-shape. Accordingly, no concerns are presented that an unbalanced load will be applied to the upper swing arm 13L, 13R. Since there are no concerns that an unbalanced load will be applied to the upper swing arms 13L, 13R, the rigidity necessary in the upper swing arms 13L, 13R is lower than in a case in which unbalanced loads are addressed. Reducing the rigidity of the upper swing arms 13L, 13R makes it possible to reduce the size and the weight of the upper swing arms 13L, 13R.

A modification perfected with particular focus on the rod member 69 will be described below.

Figure 13:
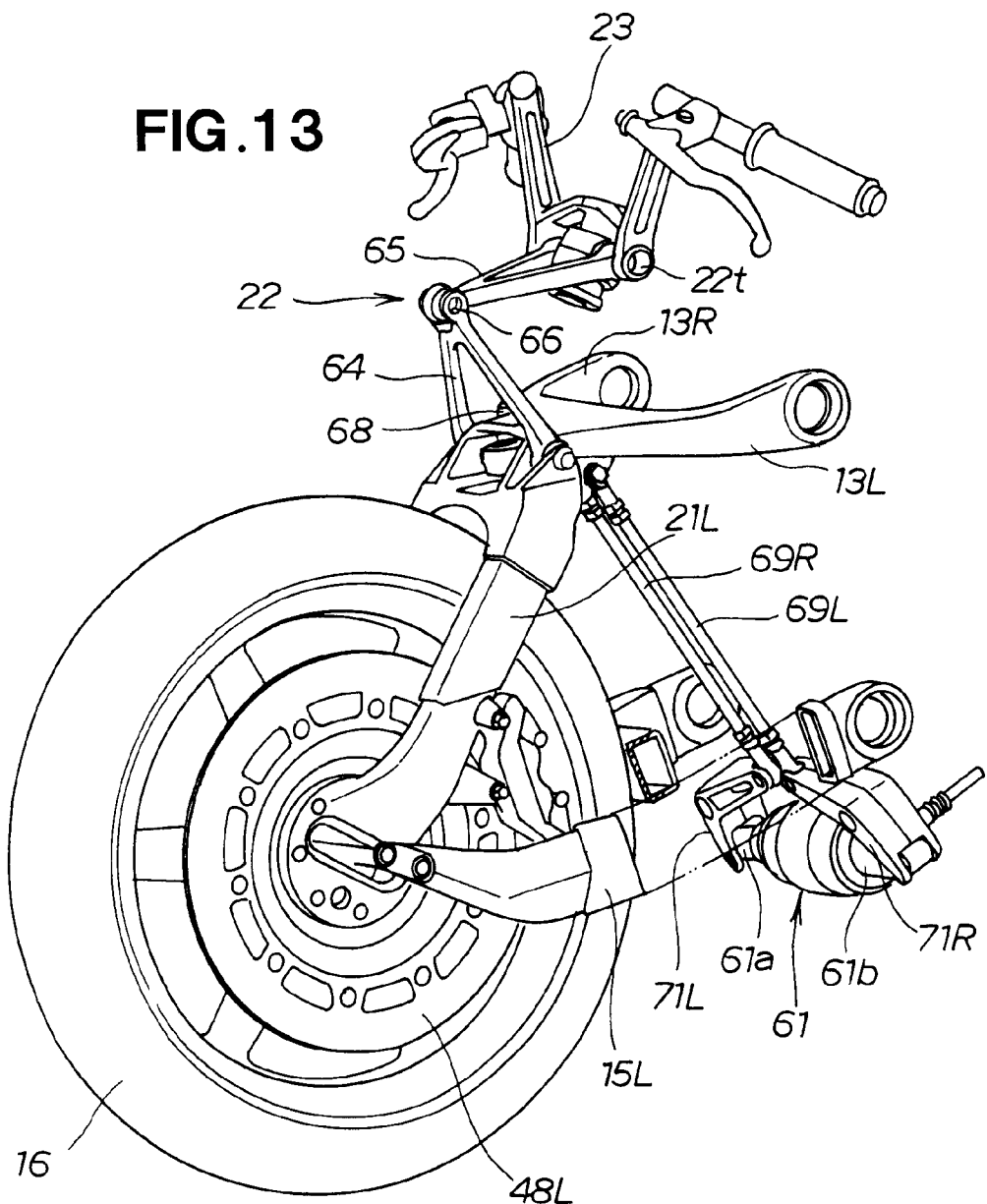
FIG. 13 is a perspective view showing a separate embodiment of the motorcycle front part shown in FIG. 4.

The modification is shown in FIG. 13. Specifically, FIG. 13 differs from FIG. 4 in that the rod member 69 is changed to a left rod member 69L and a right rod member 69R.; the L-shaped link 71 is changed to a left front link 71L and a right front link 71R. The left rod member 69L is connected to a first end 61a of the front cushioning unit 61 via the left front link 71L. The right rod member 69R is connected to a second end 61b via the right front link 71R.

Specifically, the front cushioning unit 61 is held between the left front link 71L and the right front link 71R. The force transmitted by the upper swing arms 13L, 13R is applied to the left and right rod members 69L, 69R. The force applied to the left and right rod members 69L, 69R is applied to the first end 61a and the second end 61b of the front cushioning unit 61, and the force applied to the front wheel 16 can be equally absorbed on the left and right sides.

A separate embodiment of the motorcycle of FIG. 1 will be described below with reference to FIG. 14.

Figure 14:
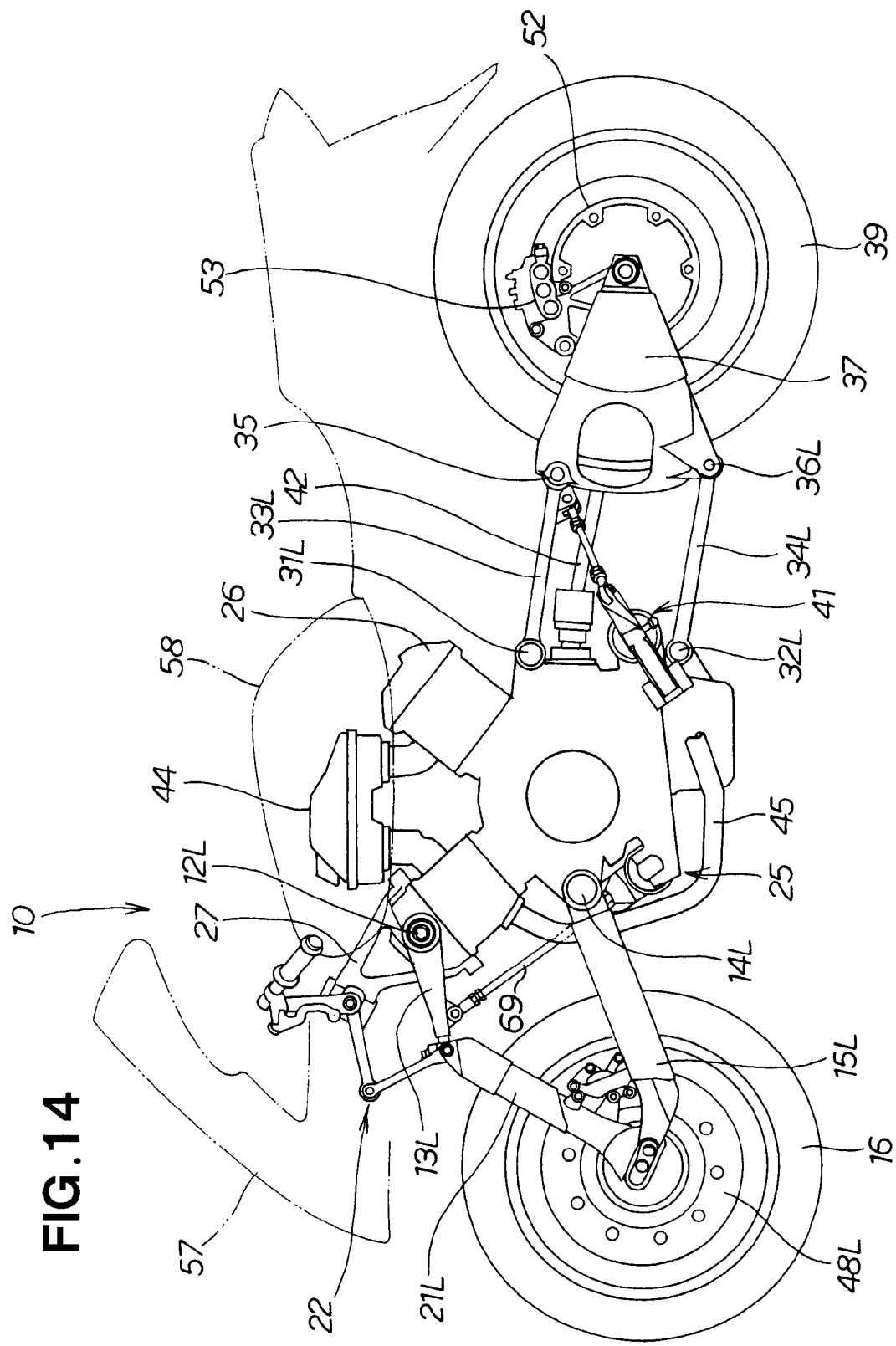
FIG. 14 is a schematic view showing a separate embodiment of the motorcycle of FIG. 1.

The motorcycle according to the separate embodiment, as can be appreciated from FIG. 14, differs from FIG. 1 in that the main frames are omitted, and the upper swing arm 13L, the lower swing arm 15L, and the upper and lower arm members 33L, 34L are directly mounted on the engine 26.

The engine 26 functions as the main frame, whereby the weight of the vehicle can be reduced.

The steering handle and a peripheral part thereof will be described below.

Figure 15:
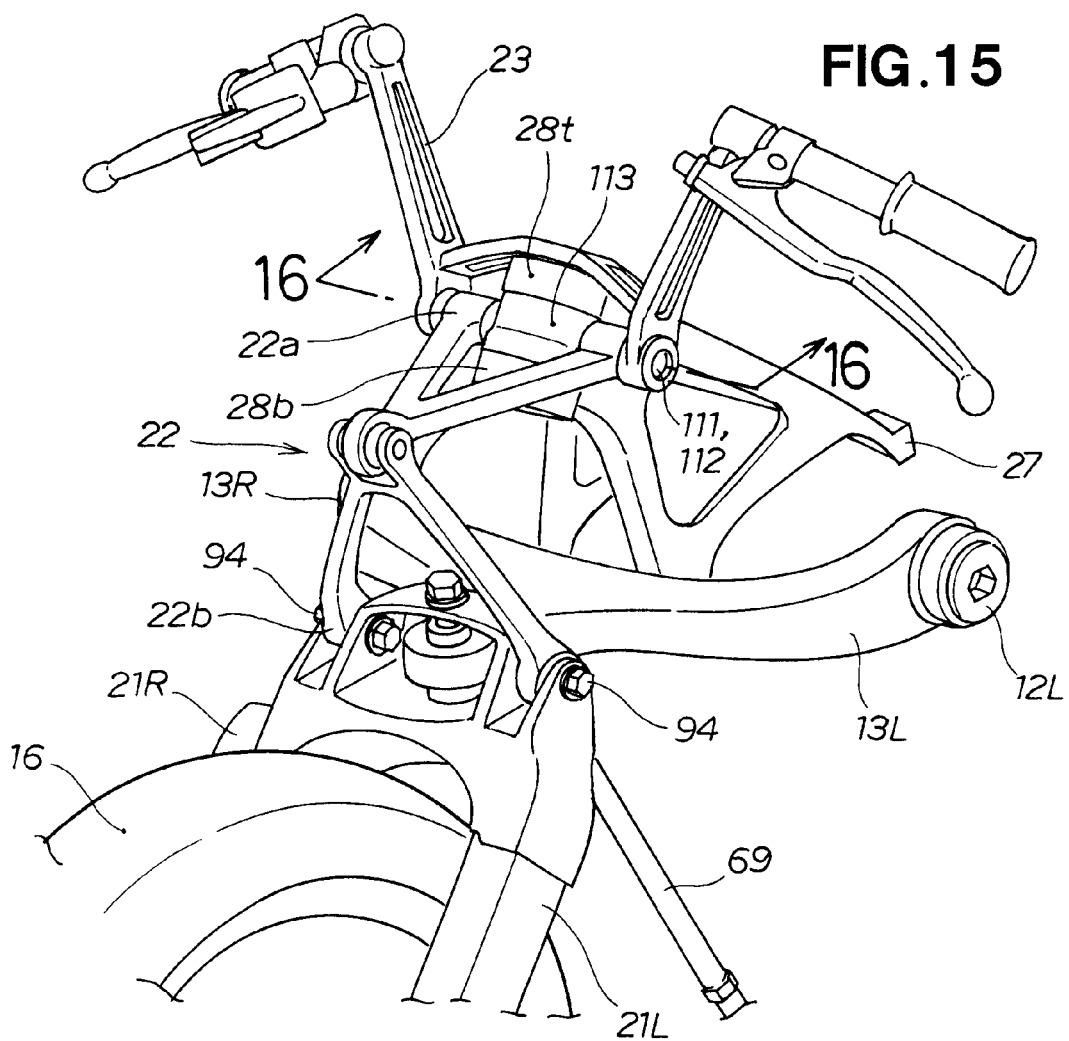
FIG. 15 is a perspective view showing the steering handle and parts associated therewith.

As shown in FIG. 15 with reference to the handle link 22, the lower end part 22b is attached to the left and right knuckle arms 21L, 21R via pin members 94, 94; and the upper end part 22a is attached to the steering handle 23.

Figure 16:
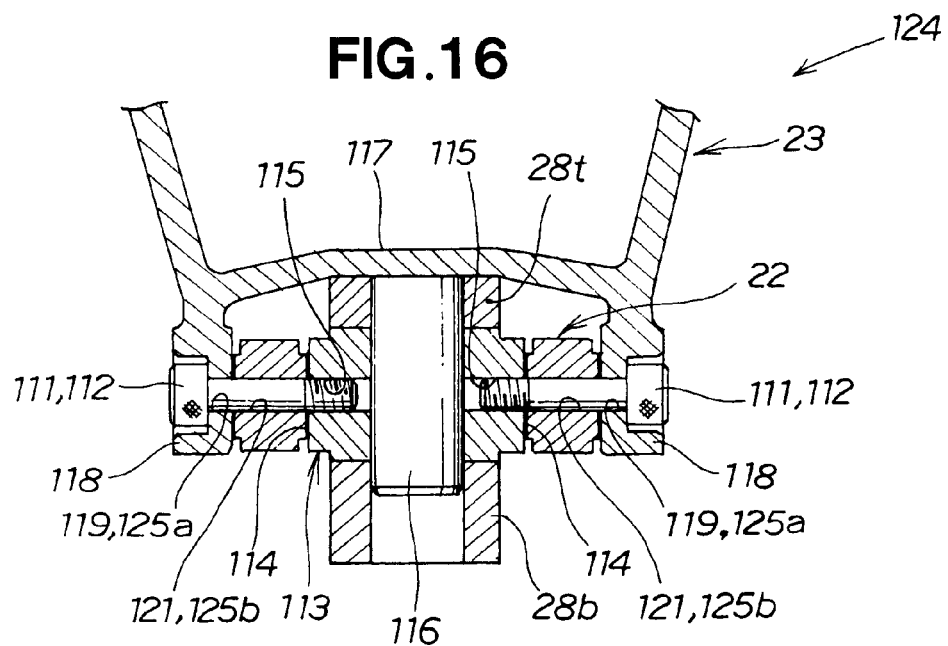
FIG. 16 is a sectional view taken along line 16-16 of FIG. 15.

As shown in FIG. 16, upper and lower head pipes 28t, 28b, which rotatably support the steering handle 23, are provided to a distal end of the handle support frame 27. A cylindrical member 113 is disposed between the upper and lower head pipes 28t, 28b. The cylindrical member tightens the steering handle 23 and the handle link 22 together via a tightening bolt 112 used as a horizontal member 111.

Specifically, a front wheel steering device 124 is provided with the horizontal member 111, which is horizontally provided along the width direction of vehicle body, and transmits steering force applied to the steering handle 23 to the handle link 22; and engaging holes 119, 125b, which are provided to the steering handle 23 and the handle link 22, and are formed so as to engage the horizontal member 111.

Bosses 114, 114 (see FIG. 17) are formed on both lateral surfaces of the cylindrical member 113. Second engaging holes 115, 115 are formed in the bosses 114, 114 as threaded holes, so that the tightening bolts 112, 112 can be threaded thereinto.

The steering handle 23 is provided with a steering shaft 116 that is inserted into and rotatably provided to the head pipes 28t, 28b; a lateral part 117 that is horizontally provided to an upper end of the steering shaft 116; and upper pin attachment parts 118, 118 that are provided to both ends of the lateral part 117 so as be substantially parallel to the steering shaft 116. The hole parts 119, 119 through which the fastening bolts 112, 112 are inserted are formed in the upper pin attachment parts 118, 118.

The steering handle 23 is provided with the steering shaft 116, which is rotatably supported by the head pipes 28t, 28b. The steering shaft 116 is supported on the head pipes 28t, 28b so as to be capable of rotating above and below the cylindrical member 113, which functions as a connecting part of the horizontal member 111. As a result, the rigidity of the steering shaft 116 is increased, the strength and rigidity of the other members can be reduced, and the weight can be reduced.

The steering shaft 116 and the steering handle 23 are connected by the horizontal member 111. Specifically, the steering handle 23, the handle link 22, and the steering shaft 116 are connected via the horizontal member 111. Consequently, the support rigidity of the handle link 22 can be increased. As a result, the necessary rigidity of the other members can be reduced, and weight can be reduced.

In the present embodiment, fastening bolts have been used as the horizontal member, but pins, keys, or other such members may also be used.

Figure 17:
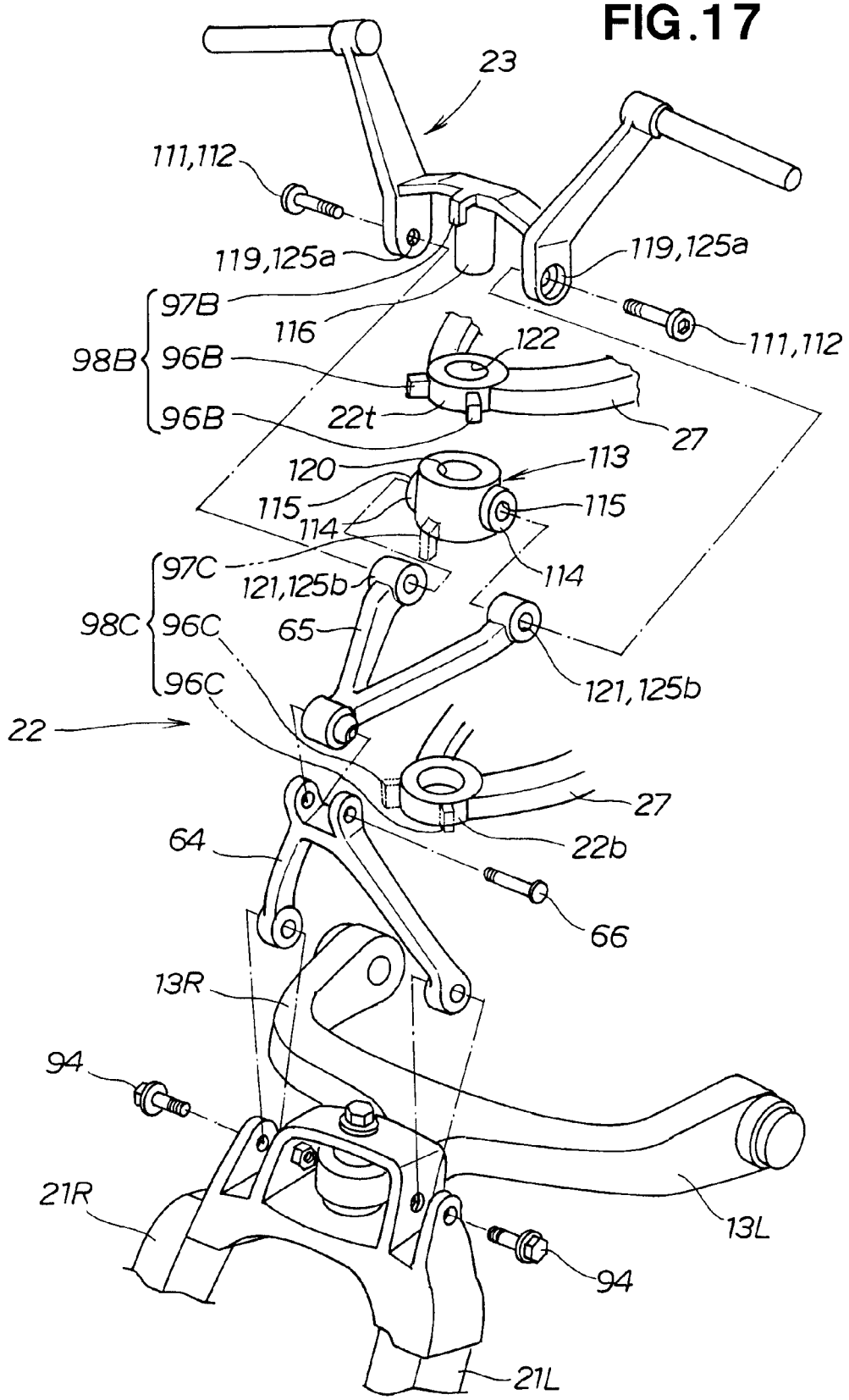
FIG. 17 is an exploded perspective view showing the steering handle and parts associated therewith.

As shown in FIG. 17, the cylindrical member 113, which has a fitting hole 120 into which the steering shaft 116 is fitted, is placed between the upper and lower head pipes 28t, 28b.

First engaging holes 121, 121 formed in the upper end part 22t of the handle link 22 are aligned with the second engaging holes 115, 115 of the cylindrical member 113. The hole parts 119, 119 of the steering handle 23 are aligned with the second engaging holes 115, 115. The fastening bolts 112, 112, which are used as the horizontal member 111, are threaded into the second engaging holes 115, 115 from the exterior on the left and right sides.

Connecting the handle link 22 and the steering handle 23 makes it possible to secure the steering handle 23 to the steering shaft 116 without forming a spline in the steering shaft 116. Since a spline is not necessary, manufacturing costs associated with the steering shaft 116 can be reduced.

A steering stopper 98B for restricting the steering angle of the front wheel can be provided to the steering handle 23.

Specifically, a pin part 97B protrudes forward and downward from the lateral part 117. Two left and right stopper parts 96B, 96B are formed on the upper head pipe 22t. The pin part 97B comes in contact with the left and right stopper parts, and the steering angle of the steering handle 23 is restricted.

It is also possible for a steering stopper 98C to be provided instead of the steering stopper 98B. In the steering stopper 98C, which is shown by the imaginary lines, a pin part 97C is provided to an outer peripheral front end part of the cylindrical member 113 on the upper part of the handle link 22, and stopper parts 96C, 96C formed to the left and the right, with which the pin part 97C comes into contact, are provided to the lower head pipes 28t, 28b.

The process of attaching the steering handle to the steering link will be described in detail below with reference to FIGS. 18A through 18C.

Figure 18A:
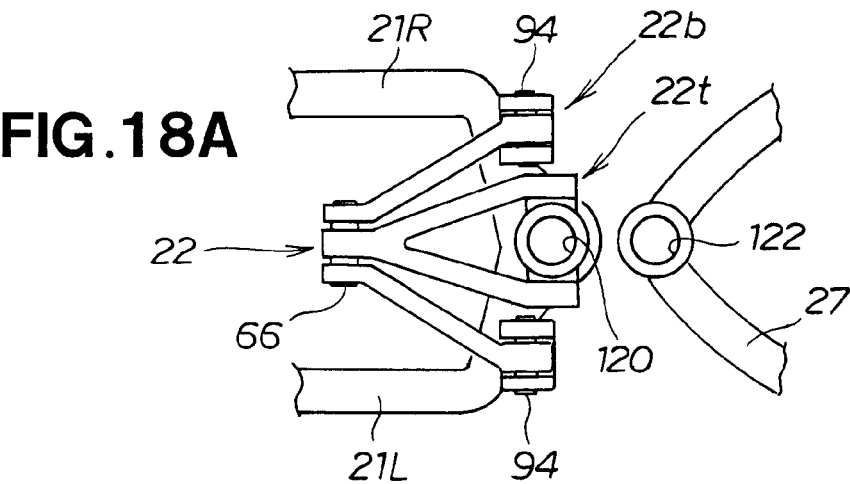
FIGS. 18A, 18B, and 18C are schematic views showing a mode of assemblage of the steering handle.

As shown in FIG. 18A, a lower end part 22b of the handle link 22 is attached to the knuckle arms 21L, 21R.

Figure 18B:
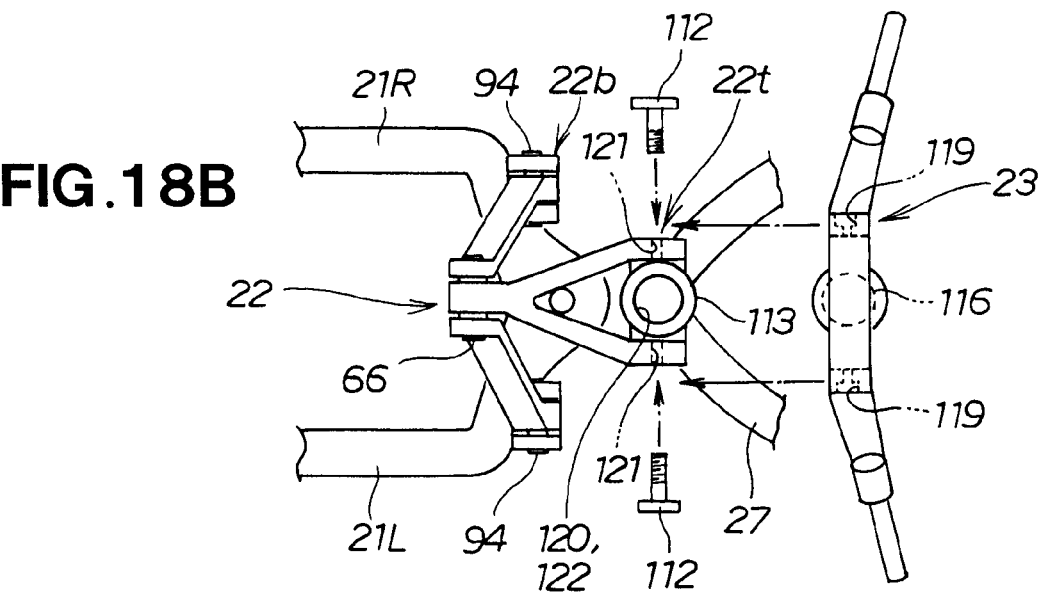

As shown in FIG. 18B, a cylindrical member 113 is disposed between the upper and lower head pipes 28t, 28b, the upper end part 22t of the handle link 22 is raised, and the steering shaft 116 of the steering handle 23 is inserted into a steering hole 122. The first engaging holes 121, 121, which are formed in the upper end of the handle link 22 as engaging holes 125, and the hole parts 119, 119 of the steering handle 23 are aligned with the second engaging holes 115, 115 of the cylindrical member 113. The fastening bolts 112, 112 are threaded into these holes from the exterior on the left and right.

Figure 18C:
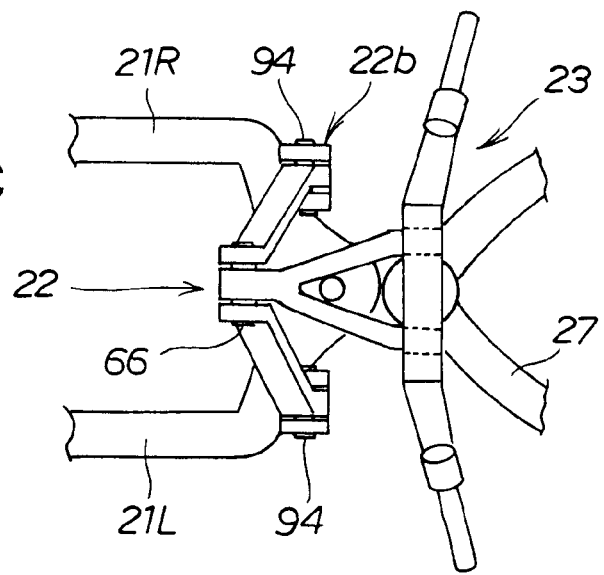

As shown in FIG. 18C, the steering handle 23 is attached to the handle link 22.

The fastening members 112 are inserted into the engaging holes 119 of the steering handle 23 and the engaging holes 121 of the handle link 22, and the handle link 22 is secured in the second engaging holes 115 of the cylindrical member 113 via the fastening members 112. The phase of the handle link 22 can be simultaneously aligned with the phase of the steering handle 23.

Specifically, it is possible to eliminate labor involved in fine tuning related to phase-aligning the steering angle of the steering handle 23.

Obviously, various minor changes and modifications of the present invention are possible in light of the above teaching. It is therefore to be understood that within the scope of the appended claims the invention may be practiced otherwise than as specifically described.

What is claimed is:

1. A motorcycle having a steering mechanism for steering a front wheel through manipulation of a steering handle, and a swing mechanism extending from one of a body frame and an engine for vertically movably supporting the steering mechanism,
   wherein the steering mechanism comprises: a hub body for rotatably supporting the front wheel; knuckle arms extending upwardly from the hub body; a handle link connected to an upper end of the knuckle arms and being capable of bending vertically; and the steering handle provided on an upper end of the handle link; and
   wherein the swing mechanism comprises lower swing arms vertically swingably connected to one of the body frame and the engine and extending to the hub body; a cross-member provided on distal ends of the lower swing arms and passing through the hub body; a lower spherical bearing provided on the cross-member for three-dimensionally rotatably supporting the hub body; upper swing arms vertically swingably connected to one of the body frame and the engine and extending to upper parts of the knuckle arms; and an upper spherical bearing provided on distal ends of the upper swing arms for three-dimensionally swingably supporting the knuckle arms.

2. The motorcycle of claim 1; further comprising a ball bearing disposed between a hub of the front wheel and the hub body.

3. The motorcycle of claim 1; wherein the hub body has an inner diameter set to be larger than an outer diameter of the cross-member, the cross member being offset from a center of the hub body.

4. The motorcycle of claim 1; wherein the knuckle arms are detachably fastened to the hub body by a first fastening member, the lower swing arms are detachably fastened to the cross-member by a second fastening member, and the first and second fastening members extend parallel to the cross-member.

5. A motorcycle having a steering mechanism for steering a front wheel through manipulation of a steering handle, and a swing mechanism extending from one of a body frame and an engine for vertically movably supporting the steering mechanism,
   wherein the steering mechanism comprises: a hub body for rotatably supporting the front wheel; knuckle arms extending upwardly from the hub body; a handle link connected to an upper end of the knuckle arms and being capable of bending vertically; and the steering handle provided on an upper end of the handle link; and
   wherein the swing mechanism comprises lower swing arms vertically swingably connected to one of the body frame and the engine and extending to the hub body; a cross-member provided on distal ends of the lower swing arms and passing through the hub body and being removably from the hub body; the cross-member having an opening for receiving a lower spherical bearing for three-dimensionally rotatably supporting the hub body on the distal ends of the lower swing arms; upper swing arms vertically swingably connected to one of the body frame and the engine and extending to upper parts of the knuckle arms; and the upper swing arms defining an opening for receiving an upper spherical bearing for three-dimensionally swingably supporting the knuckle arms on the distal ends of the upper swing arms.

6. The motorcycle of claim 5; further including a lower steering shaft vertically inserted into the hub body, the lower spherical bearing being attached along the lower steering shaft.

7. The motorcycle of claim 6; wherein an outer peripheral surface of the lower spherical bearing is a spherical surface, and the spherical surface is rotatably fitted within the opening of the cross-member.

8. The motorcycle of claim 6; wherein the lower steering shaft is adapted to rotate across three dimensions by operation of the lower spherical bearing, with the cross-member being used as a reference.

9. The motorcycle of claim 5; wherein upper ends of the knuckle arms are connected by an arm connecting part, and further including an upper steering shaft releasably connected to the arm connecting part, the upper spherical bearing being fitted onto the upper steering shaft.

10. The motorcycle of claim 9; wherein the distal ends of the upper swing arms include concave parts, the concave parts being fitted on an outer spherical surface of the upper spherical bearing.

11. The motorcycle of claim 10; wherein the upper spherical bearing, the knuckle arms, and the handle link are adapted to rotate across three dimensions, with the upper swing arms being used as a reference.

12. The motorcycle of claim 5; wherein the upper and lower spherical bearings allow for the swing mechanism to only include the lower swing arms and the upper swing arms.

13. The motorcycle of claim 5; wherein the knuckle arms are detachably fastened to the hub body by a first fastening member, the distal ends of the lower swing arms being detachably fastened directly to the cross-member by a second fastening member.

14. The motorcycle of claim 5; further including stopper parts provided on the cross-member for restricting a steering angle of the hub body, the stopper parts contacting a portion of the hub body.

* * * * *